United States Patent [19]

Gupta et al.

[11] 4,154,219

[45] May 15, 1979

[54] PRISMATIC SOLAR REFLECTOR APPARATUS AND METHOD OF SOLAR TRACKING

[75] Inventors: Youdhishthir P. Gupta, Richardson; Mark J. O'Neill, Dallas, both of Tex.

[73] Assignee: E-Systems, Inc., Dallas, Tex.

[21] Appl. No.: 776,653

[22] Filed: Mar. 11, 1977

[51] Int. Cl.² ............................................. F24J 3/02
[52] U.S. Cl. .................................. 126/270; 126/271; 350/293; 353/3
[58] Field of Search .............................. 126/270, 271; 250/203 R, 203 CT; 353/3; 60/641; 350/102–104, 106, 109, 167, 288, 299, 293

[56] References Cited

U.S. PATENT DOCUMENTS

| | | | |
|---|---|---|---|
| 2,175,067 | 10/1939 | Rolph | 350/106 X |
| 3,134,906 | 5/1964 | Henker | 126/270 X |
| 3,917,942 | 11/1975 | McCay | 250/203 R |
| 3,968,786 | 7/1976 | Spielberg | 126/270 |
| 3,981,151 | 9/1976 | St. Clair | 60/641 |
| 4,013,885 | 3/1977 | Blitz | 250/203 R |
| 4,031,385 | 6/1977 | Zerlaut et al. | 250/203 R |
| 4,034,735 | 7/1977 | Waldrip | 60/641 X |
| 4,056,094 | 11/1977 | Rosenberg | 165/171 |
| 4,061,130 | 12/1977 | Gonzalez | 250/203 R X |

OTHER PUBLICATIONS

Rabl, Prisms with Total Internal Reflection as Solar Reflectors, May 1976, Report SOL 76–04, prepared by Argonne National Laboratory, for the Division of Solar Energy, U.S.E.R.D.A. under Contract W-31-109-Eng-38.
Rabl, Prisms with Total Internal Reflection as Solar Reflectors, *Solar Energy*, vol. 19, No. 5, pp. 555–565 (1977).

*Primary Examiner*—Carroll B. Dority, Jr.
*Assistant Examiner*—Larry Jones
*Attorney, Agent, or Firm*—Robert V. Wilder

[57] ABSTRACT

A prismatic plate is mounted with its flat face exposed to the sun on a reflector panel for use in a solar energy collection system. The plate includes a plurality of triangular prisms with parallel longitudinal axes shaped to provide total internal reflection of incident light rays. Each prism has a cross section forming a right-angled isosceles triangle with the two equal-length, rear faces of the prism oriented at 45 degrees relative to the front face of the plate. The base of each prism forms or is parallel to a front plate surface which receives incident solar light rays. The rays are transmitted through the plate cross section without refraction in the plane of the cross section to be reflected from the two rear faces and back out the front face toward a solar receiver. The prism material has an index of refraction equal to or greater than the square root of two so that there is total internal reflection from the prism faces. The prismatic plate is mounted on a movable heliostat panel controlled by a tracking system to reflect to a solar receiver. The panel has a fixed axis directed toward a central receiver and a moving axis orthogonal to the fixed axis. The prismatic plate is mounted on the panel with the longitudinal axes of the prisms perpendicular to the moving axis. Tracking is accomplished by adjusting the panel orientation so that the plane of incidence of the incident solar rays is parallel to the longitudinal axes of the prisms and also so that the reflected solar rays intercept the receiver.

30 Claims, 19 Drawing Figures

PRISMATIC SOLAR REFLECTOR APPARATUS AND METHOD OF SOLAR TRACKING

BACKGROUND OF THE INVENTION

The present invention relates to a system for the conversion of solar energy. More particularly, the present invention is concerned with a prismatic solar reflector panel and a method of solar tracking for use in a solar energy conversion system.

One of the methods currently being investigated for the generation of electricity from solar energy is the Heliostat-Central Receiver concept, also called the Solar Power Tower System. In this system, flat or slightly concave mirror panels are mounted on rotating pedestals so that each mirror panel tracks the sun to reflect the solar rays to a receiver located at the top of a tower. An array of many such panels are positioned around the tower to focus a large amount of solar energy on the receiver. The receiver functions as a boiler to produce steam or a heated working fluid for use in a conventional turbine-generator power plant. Each set of one or more mirror panels, together with appropriate support structure and a tracking system, is known as a heliostat. Many thousand such heliostats are necessary for the operation of a multi-megawatt power installation, with about one-half of the total cost of such a power system being required for the heliostats.

Current heliostat panels use metallized glass or plastic, in sheet or film, as the reflector material. Silver or aluminum are the most common metals for this application, both requiring protection from oxidation by an overcoating of plastic or glass. Such reflector panels encounter losses due to absorption and scattering of the incident light by the metal reflectors and by the glass or plastic transparent covering. Even highly polished silver absorbs and scatters about six percent of the incident sunlight, and a typical glass covering absorbs and scatters another eight percent of the sunlight as the light passes through the glass before and after being reflected from the metal surface. Thus, the specular reflectance of a second-surface, silvered-glass mirror is typically only about 80 to 86 percent. Silvered plastics generally have similar specular reflectance values. Polished, clear-anodized aluminum sheeting has a specular reflectance much less than for silvered glass, typically about 58 to 75 percent.

In addition to the disadvantage of relatively low specular reflectances, both glass and plastic metallized mirrors are expensive for solar energy reflector panels, typically costing about one dollar per square foot or more in large quantities. Furthermore, plastic mirrors are not durable when exposed to normal outdoor variations in temperature and moisture. The difference in the coefficients of thermal and moisture expansion of the metal and plastic materials used in the panels results in a gradual degeneration of the bond between them. Although glass mirrors are more lasting, the heavy weight and fragile nature of glass are severe disadvantages in most solar energy applications.

A number of different heliostat designs are currently under investigation. Most approaches used a metal frame construction with glass mirrors directly exposed to the wind and weather. In one configuration, four mirror modules are mounted inside a gimbal frame which rotates upon two vertical "I" beams arising from concrete slabs. This approach requires separate alignment for each of the mirror modules in the heliostat. Other applications utilize rectangular or trapezoidal segments in an array mounted on a vertical yoke or pedestal. The individual mirror segments can be prefocused to some degree, and the entire array is rotatable as a unit about the yoke or pedestal for automatic solar tracking. In another application a plastic air-supported dome is provided to protect a heliostat panel of stretched aluminized polyester film membrane attached to a circular frame. Although this design provides the protection from the elements necessary for an extremely lightweight system, the heliostat performance is reduced roughly 20 percent due to transmission losses in the plastic dome.

In the past, prisms or prismatic plates employing multiple-element arrays have been used primarily for refracting light rays into a spectrum in which the radiation components are separated according to wave length. Prisms have also been used in binoculars and other imaging instruments to provide total internal reflection (TIR) without refraction. This condition occurs only if the angle of incidence of a light ray falls within a limited range when impinging the internal surface of a material having a given index of refraction. A similar total reflection principle has also been applied in other areas not involving prisms. For example, in fiber optics light is transmitted along a hollow glass tube by total reflection. More recently, in the field of solar energy collection, a compound parabolic concentrator has been investigated which uses a trough-like surface for total internal reflection to funnel light within the concentrator to an absorber unit. This type of design appears to be impractical for most solar collection systems because of the prohibitively large dimensions necessary for the concentrator to provide solar energy conversion in useful quantities.

SUMMARY OF THE INVENTION

The present invention concerns a solar reflector panel having a plurality of right-angle isosceles triangular prisms arranged in a parallel row or in an integral prismatic sheet. The prism bases or the prismatic sheet form a front surface through which light rays are transmitted internally within each prism to the prismatic rear faces of the panel. The rays are consecutively reflected internally from both rear faces of the triangular prism and back through the front surface. To provide total internal reflection, both rear prism faces are slanted at a 45-degree angle relative to the front face, and the transparent material used in the triangular prisms has an index of refraction greater than the square root of two. A tracking system rotates the panel about two axes to reflect rays from the sun to a solar receiver. The panel is maintained in a position relative to the sun so that the plane of incidence remains parallel to the longitudinal axes of the prisms and so that the reflected rays intercept the receiver.

In accordance with another aspect of the present invention, reflector apparatus is provided for the total internal reflection of solar rays in a solar energy collection system. A prismatic plate has a front transparent face for receiving solar rays incident in a first plane substantially normal to the front face in a cross section of the plate and for transmitting the rays through the plate. A rear patterned face has a plurality of prismatic surfaces for totally internally reflecting the transmitted solar rays to direct the reflected rays back through the plate and out the front face of the plate in a second plane substantially normal to the front face.

In accordance with another aspect of the present invention, apparatus for reflecting solar rays to a receiver in a solar energy collection system includes a prism member having an index of refraction equal to or greater than the square root of two. The prism member includes a front face for receiving the incident solar rays and transmitting the rays through the prism member. A plurality of pairs of prism faces are provided, each pair being oriented at substantially 45 degrees relative to the front face and at substantially 90 degrees relative to each other. Each solar ray incident on the first face is transmitted to one of the pairs of prism faces and totally internally reflected to the second prism face. The ray is then totally internally reflected from the second face back out through the front face to the solar receiver in a plane of reflection parallel to the plane of incidence of the corresponding incident ray.

In another aspect of the present invention, a system is provided for the reflection of solar rays to a solar energy receiver. A reflector panel has a transparent front surface to receive the solar rays and a back surface forming a plurality of prisms having parallel longitudinal axes. The prism are configured to totally internally reflect a light ray transmitted through the panel from the front surface and having a plane of incidence parallel to the longitudinal axes of the prisms. A support structure mounts the reflector panel and rotates it about multiple axes. A tracking system controls the support structure to orient the panel so that the solar rays are reflected to the receiver. The panel movement is controlled so that the plane of incidence of the solar rays is parallel to the longitudinal axes of the prisms and so that the reflected solar rays intercept the receiver.

The present invention provides several important advantages over the prior art. By using the described configuration, total internal reflection is achieved at each prism face, and solar losses are limited solely to internal absorption and scattering, which are substantially less than five percent. No metallic surfaces are required so that losses due to metallic absorption are eliminated. Thus, the specular reflectance of panels implementing the present invention is 95 percent or higher. Since only a single transparent medium is required for reflection, costly and troublesome bonding of dissimilar materials is not necessary. Moreover, the absence of metals eliminates oxidation problems, and outdoor weathering damage is substantially decreased. Since metallic absorption is eliminated, the equilibrium temperature of the panels of the present invention is less than for metallic reflective surface mirrors, thereby reducing thermal problems and improving the lifetime of the panel.

Thin, low absorption plastic such as acrylic may be used to provide a panel which is lightweight, durable, virtually unbreakable and economical. The prismatic panels of the present invention can be easily and economically fabricated, preferably by calendering or hot rolling an extruded sheet of plastic, or by other processes such as molding or stamping. The reflector panel configuration enables two-axis tracking with one axis directed at the receiver for design simplicity.

The novel features which characterize the invention are defined in the appended claims. The foregoing and other objects, advantages and features of the invention will hereinafter be described, and for purposes of illustration of the invention but not of limitation, exemplary embodiments of the invention are shown in the appended drawings.

DETAILED DESCRIPTION

Referring now to the drawings, FIGS. 1, 2, 3, and 4 disclose a prismatic panel 10 with a typical solar ray 20 being reflected by the panel faces. Panel 10 is preferably formed of an integral sheet of transparent material such as glass or plastic having a smooth, transparent front face 12 and a back face 13 which has been shaped or impressed to provide a pattern of multiple triangular prisms 14, best seen in FIG. 2. The longitudinal axes of the prisms 14 are parallel to each other, and each prism 14 has a cross section forming an isosceles triangle with two equal length sides 15 and 16 forming a 90 degree angle at the apex of each prism. Prism sides 15 and 16 are slanted at 45-degree angles relative to the front face 12 of the panel to provide total internal reflection for light rays properly angled relative to prisms 14. A solid panel width 18 extends between front face 12 and back face 13 of the panel.

Figure 1:
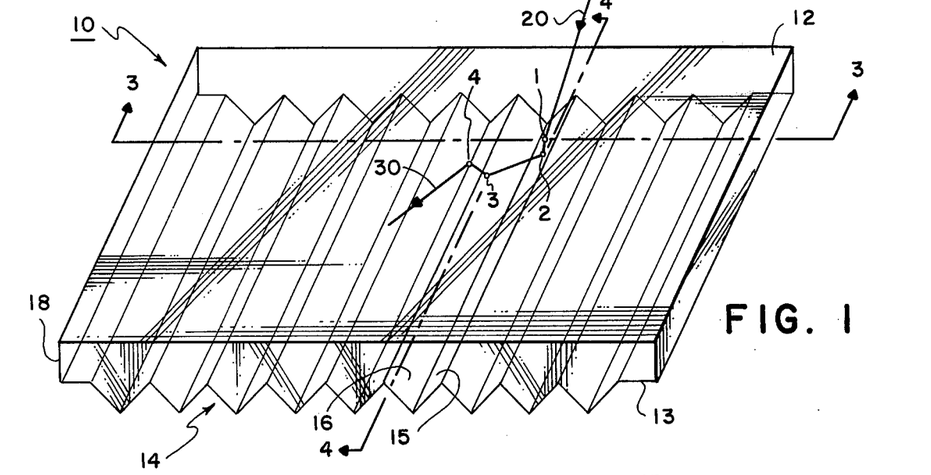
FIG. 1 is a perspective view of the front flat surface of a prismatic panel of the present invention.

Prisms 14 are very small, preferably 0.05 inches wide, with the underlying sheet thickness 18 being about 0.06 inches thick. The preferred material for prismatic panel 10 is acrylic plastic because of its strength and lightweight and easy-fabrication characteristics. However, other materials may be used including water-clear glass which is low in iron content, polycarbonate plastic and polyester plastic. Panel 10 is preferably formed by extrusion, although casting, injection molding or compression molding can be used. In the preferred method, thin sheets of clear acrylic are extruded and rolled between polished steel rollers to impress the desired prismatic pattern onto the back face of the sheet.

The relationship between the angle of incidence and the index of refraction which is necessary to achieve total internal reflection is well known by those skilled in the art, and is readily derived from Snell's law as follows:

$$\theta \leq \sin^{-1}(1/n)$$

where $\theta$ is the angle of incidence and n is the index of refraction. For the prisms of the present invention, the angle $\theta$ is preferably about 45 degrees as previously described. Thus, the index of refraction must be equal to or greater than the square root of two. Most materials of interest for the present application have indices of refraction meeting this requirement. For example, glass and acrylic plastic have indices of refraction of about 1.5.

Figures 2, 3, 4:
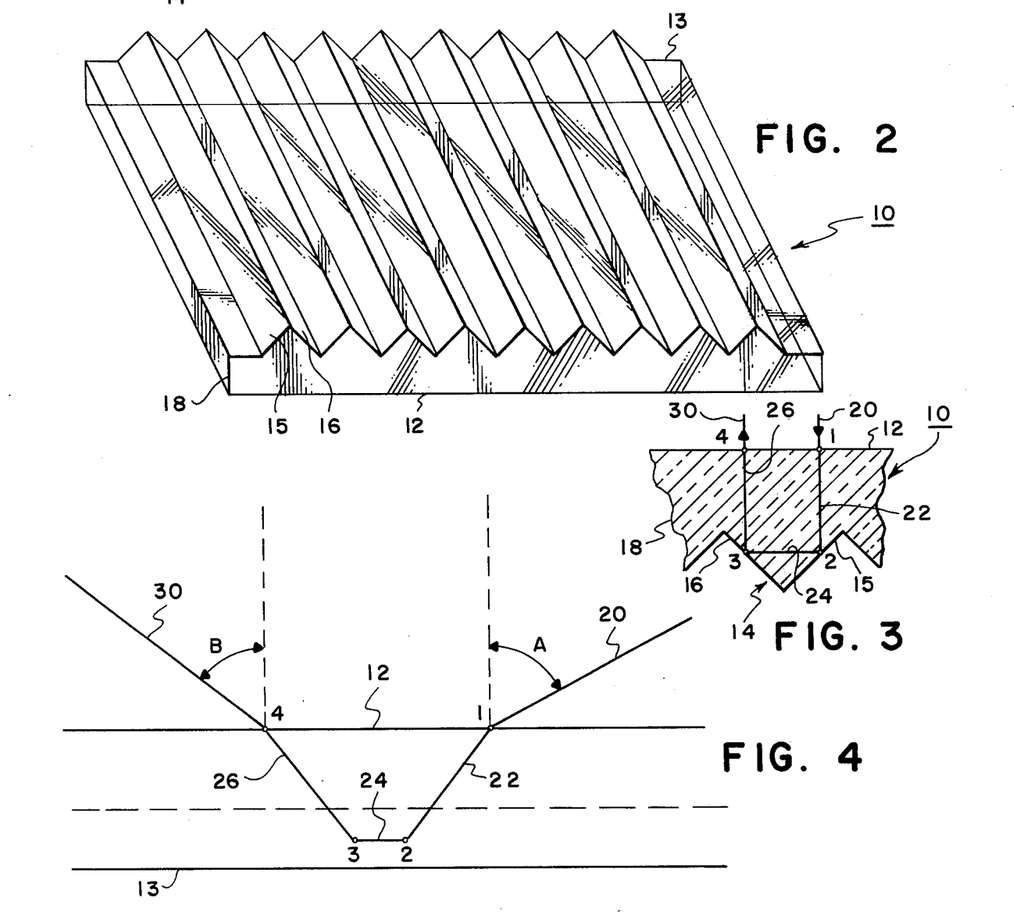
FIG. 2 is a perspective view of the prismatic rear surface of the panel shown in FIG. 1.
FIG. 3 is a cross section of FIG. 1 taken along lines 3—3.
FIG. 4 is a cross section of the panel of FIG. 1 taken along lines 4—4.

The path taken by solar ray 20 within prismatic panel 10 is best shown in the cross-sectional view of FIG. 3. This view is perpendicular to the plane of incidence which is defined as the plane containing the incidence ray and the surface vector normal to the panel at the point of incidence 1. To achieve total internal reflection the plane of incidence of impinging light ray 20 must be oriented parallel to the longitudinal axes of the prisms 14. Stated another way, ray 20 must be perpendicular to the front face 12 of the prism in a cross section of the prism at the point of incidence 1, as shown in FIG. 3.

As the incident ray 20 impinges on panel 10 perpendicular to surface 19, no refraction occurs in the cross section, and ray 20 is transmitted directly through the intermediate panel thickness 18 to the first back face 15 of prism 14. Ray 20 strikes the first reflection point 2 at a 45-degree angle and is totally reflected at another 45-degree angle. The first reflected ray 24 is transmitted parallel to front face 12 through prism 14 to impinge the second back face 16 at the second reflection point 3 at a 45-degree angle. The second reflected ray 26 is then directed at a 45-degree angle with respect to face 16 upward through thickness 18 of panel 10 to exit front face 12 at the point of reflection 4. At that point the plane of reflection, defined as the plane containing the reflected ray and a surface vector normal to the panel at the point of exit, is parallel to and spaced from the plane of incidence.

FIG. 4 is a cross-sectional view along the longitudinal axis of prism 14 showing the path taken by ray 20 in a plane parallel to the prism axes. In the general case, solar light ray 20 approaches the surface 19 in the plane of incidence A. Ray 20 is refracted as it passes into panel 10 and is further bent as second reflected ray 26 passes out of panel 10 at point 4, so that the angle of reflection B is equal to the angle of incidence A. The light ray 30 emerging from the prism will contribute to a reversed image of the sun which will have no effect on the transfer of energy in connection with solar reflectors.

Theoretically, non-absorbing materials would provide perfect 100 percent spectral reflectance for the prismatic panel. In practicality, the specular reflectance would be somewhat lower due to absorption by the prism materials and variations in the ideal configuration of the prismatic panel, such as rounded points and valleys on the prisms and non-optically smooth prism surfaces. However, an actual reflectance value of 95 percent or better is possible using thin TIR panels of the proper acrylic resin.

Figures 5, 6, 7, 8, 9:
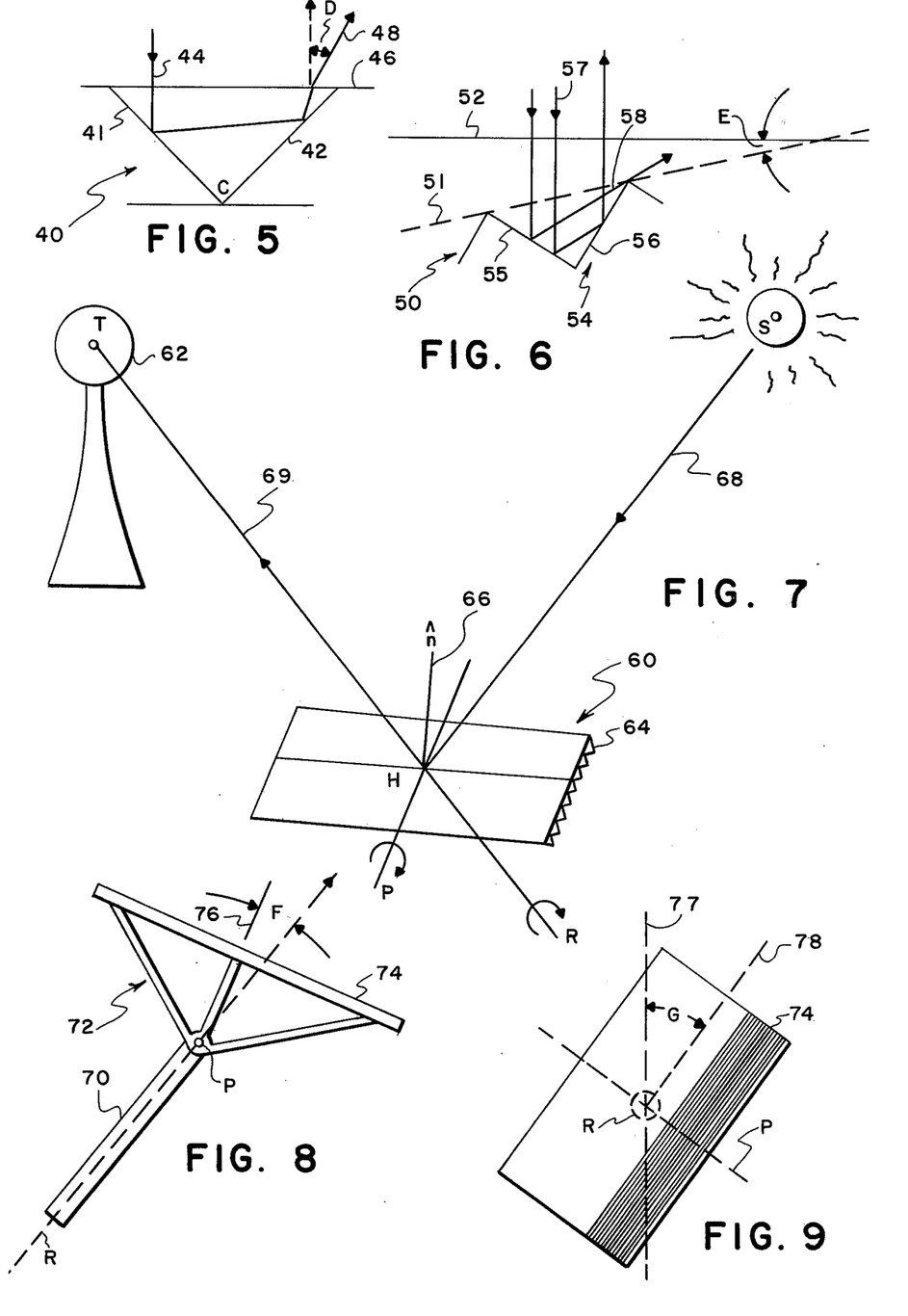
FIGS. 5 and 6 are cross sections of a panel similar to that of FIG. 1 showing examples of incorrect construction of the rear surface of the panel.
FIG. 7 is a diagram showing the relationship between the sun, the panel of the present invention and the receiver of the present invention.
FIGS. 8 and 9 are diagrams showing the rotational movements of the panel of the present invention.

It should be understood that other prismatic fabrications and structures fall within the scope of the present invention. For example, individual elongated prisms may be manufactured by a molding process and then joined together or supported by a common base plate to present a smooth, flat surface. However, in any prismatic design, it is important that the prism rear faces are slanted at substantially a 45-degree angle relative to the front face. Preferably the rear faces form a right-angle, isosceles triangle in cross section with the base of the triangle parallel to or flush with the flat light-receiving front surface. The effect of substantial deviations from this prism configuration for the panel of the present invention is analogous to the surface slope error effect for conventional silvered glass mirrors. However, the amount of reflected ray angular error resulting from an error in prism design for the present invention is about three times as great as with a similar degree of design error for conventional mirrors. FIG. 5 shows in cross section a prism 40 having one rear face 41 slightly longer than the other rear face 42 so that the angle C formed by the two sides is not a 90-degree angle. Thus, although impinging light ray 44 strikes the panel perpendicular to surface 46, the angles of reflection from the internal prism faces 41 and 42 are skewed so that the exiting ray 48 is refracted at surface 46. The resulting error angle D is approximately three times the expected error from a conventional mirror.

Other errors may arise if the prism orientation relative to the flat front face of the panel is not correct, as shown in FIG. 6. If the baseline 51 of prism 54 is slanted by an angle E with respect to the front face 52 of the panel some of the reflected rays will be lost. In this context, some light rays 57 will still be properly reflected from both rear faces and will exit face 52 in the right direction. However, other light rays 59, after reflection from back faces 55, miss face 56 and are lost. The fraction of incident light lost by this effect is equal to the tangent of angle E, which becomes larger for greater values of the error angle. Morever, if E exceeds a certain value for a given index of refraction, total internal reflection will no longer occur and some of the light will be lost by transmission through the rear prism faces.

In using the panels of the present invention in a heliostat system, a method of tracking the sun different from conventional approaches is required. Since the prismatic panel will function effectively only if the plane of incidence is parallel to the longitudinal axes of the prisms, the tracking mount structure should be disposed to allow rotation about axes different than those in conventional heliostat tracking systems. With reference to FIG. 7, one of the preferred embodiments of the tracking system of the present invention is shown, illustrating the relationship between the panel 60, the tower receiver 62 and the sun S. The prisms 64 are mounted with the longitudinal axes running parallel to the longitudinal axis of panel 60 which rotates about axes R and P. Axis R is a fixed roll axis running along a line from the center H of panel 60 to the center T of tower receiver 62. Axis P is a variable pitch axis lying perpendicular to axis R in a common plane with the transverse axis of panel 60 and passing through the center H of the panel. A panel surface normal vector 66 extends from the center of the heliostat panel 60. The sun S, the receiver center T and the center point H of the heliostat panel lie within a common plane TSH.

In operation, panel 60 is first rotated about axis R to bring the panel normal vector 66 into plane TSH. Panel 60 is then rotated about axis P to bring the reflected solar rays 69 in communications with receiver 62. Thus, the heliostat of the present invention is receiver oriented rather than altitude-azimuth positioned as with conventional tracking mounts.

FIGS. 8 and 9 show the mount rotation of the foregoing preferred embodiment of the tracking system. As shown in FIG. 8, fixed axis R is the roll axis running along the shaft 70 of a mount 72. The variable axis P is the pitch axis perpendicular to the paper at the end of shaft 70. Panel 74 is slanted at a pitch angle F between the roll axis R and the surface normal vector 76 of the panel 74. FIG. 9 shows a plan view of panel 74 with roll axis R extending verticaly out of the panel surface and with the pitch axis P lying orthogonal to the roll axis. The amount of roll rotation about roll axis R is indicated by a roll angle G between a vertical reference plane 77 and the longitudinal center axis 78 of panel 84. The maximum variations in roll and pitch angles necessary for tracking the sun using the system of the present invention is approximately between 0° and 75° for the pitch angle F and approximately between −180° and +180° for the roll angle G.

Other tracking arrangements are also feasible for the heliostat of the present invention. for example, an azimuth-elevation-azimuth configuration could be used, although implementation would be more difficult. The fixed receiver-axis approach shown in FIGS. 7–9 is probably the simplest approach for the present invention.

Using the foregoing mount positioning, the desired prism orientation on the panel is also simplified. Since the roll axis R is permanently pointed directly at the receiver, the longitudinal axes of the prisms on the heliostat panel should be mounted perpendicular to the pitch axis P. Using this approach, proper adjustments of the pitch and roll angles relative to time will maintain the orthogonality of the reflector panel surface to the TSH plane and will retain the prismatic axis parallel with that plane.

Figure 10:
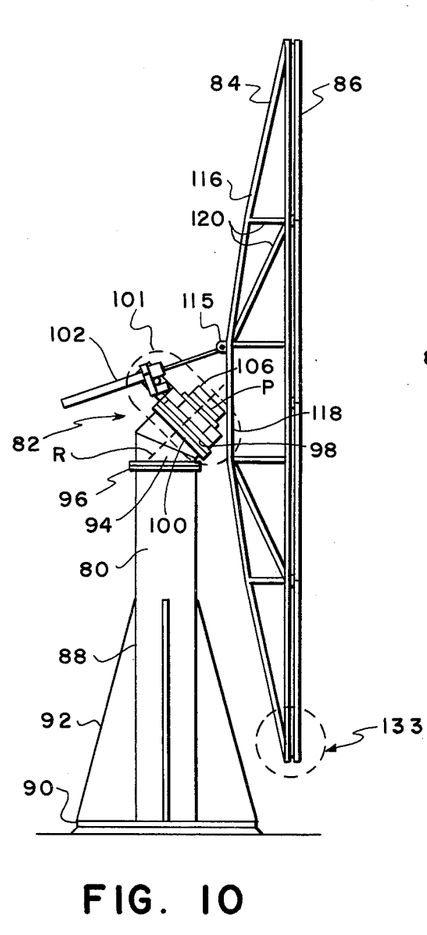
FIG. 10 is a side elevation view of the heliostat of the present invention.
Figure 11:
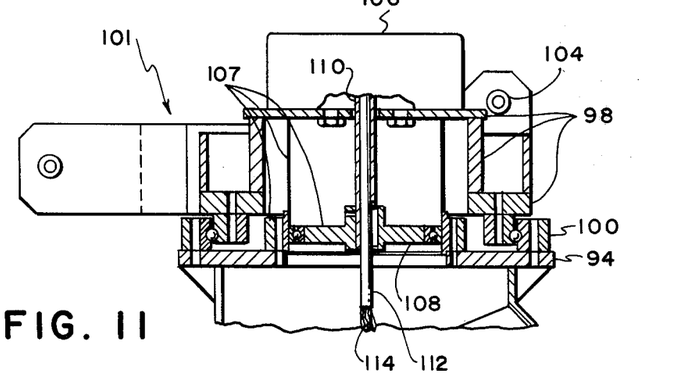
FIG. 11 is a cross section of the circled portion of FIG. 10.
Figure 12:
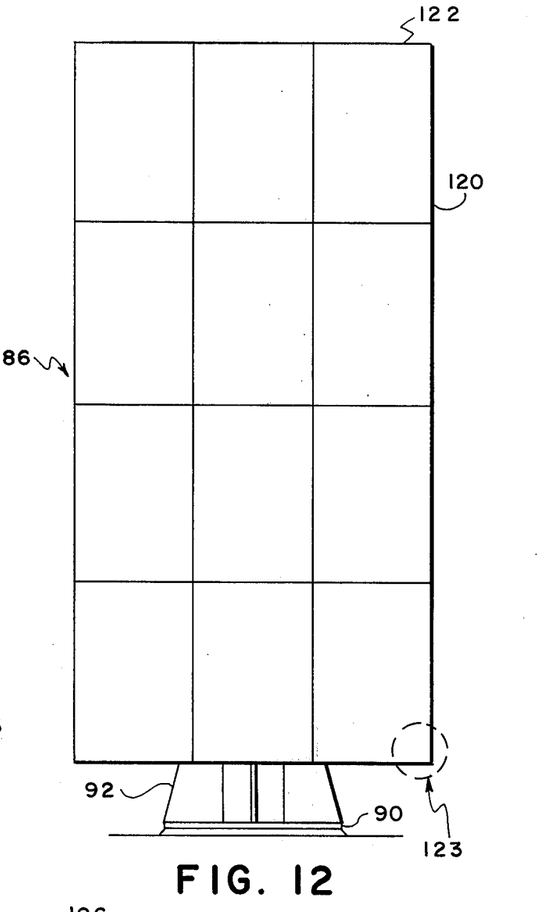
FIG. 12 is a front plan view of the heliostat shown in FIG. 10.

Referring now to FIGS. 10, 11 and 12 a preferred embodiment incorporating the heliostat of the present invention is shown. The structure disclosed therein consists of four major subassemblies: a heliostat support structure 80, a pedestal 82, a reflector panel support structure 84 and a reflector panel 86. The heliostat support structure 80 provides a structural interface between the heliostat and the foundation. Structure 80 also provides the path for transmitting all static and dynamic loads impressed on the heliostat and the pedestal to the ground. Support structure 80 preferably includes a fabricated standard steel pipe column 88 with a base plate 90 and four gussets 92 radiating from column 88 toward the corners of base plate 90.

A pedestal adaptor 94 is fastened to the top of heliostat support structure 80 by a flange 96 welded to the top of column 88. The azimuth or roll axis R is pointed directly at the tower receiver and the pitch axis P is directed perpendicular to the drawing at the pitch axis bearing 104 connecting pedestal 82 and support structure 81. The roll axis of each heliostat will have a different angular relationship with the receiver depending upon the radial position of the heliostat in the field.

Each pedestal adaptor 94 is preset, preferably in the factory, to provide the appropriate roll axis angle for the pedestal 82 on each particular heliostat. Pedestal adaptor 94 also provides a support for the outer race of a roll axis bearing 100 better seen in FIG. 11.

Pedestal 82 provides the requisite movement about the pitch and roll axes and interfaces between the heliostat support structure 80 and the reflector panel support structure 84. Pedestal 82 has conventional facilities for driving each of the two axes of rotation and includes data outputs for real time position information. The upper portion of pedestal 82 forms a pedestal yoke assembly 98 which includes a seat for the inner race of roll axis bearing 100. Yoke assembly 98 also provides conventional pitch axis and attachment facilities for the lower end of a pitch axis linear actuator 102. Orthogonality of the pitch and roll axes is obtained by well-known methods, preferably by face milling the roll axis bearing seat and, using this surface as a reference, line boring the pitch axis bearing seats. The roll axis drive 106 is seated above a harmonic drive assembly 107 mounted within yoke assembly 98. A wave generator 108 having an input shaft 110 is mounted within roll axis bearing 100. A cable conduit 112 runs concentrically within input shaft 100 carrying power and signal cables 114 to the electrical circuitry of the heliostat.

The reflector panel support structure 84 mounts reflector panel 86 on pedestal 82. Structure 84 is attached to pedestal yoke assembly 98 at pitch axis bearing 104 and the upper end 115 of pitch axis linear actuator 102. Panel support structure 84 is preferably an aluminum assembly having two mutually perpendicular box trusses 116 intersecting a centrally-located hub 118 forming the pitch axis P. Trusses 116 have a high section modulus design to minimize deflections under combined bending and tortional loads resulting from gravity, acceleration and wind. Hub 118 is preferably a space frame having sheet metal shear webs through which loads are transmitted to the pedestal. Triangulated flat trusses 120 perpendicular to the box trusses support the reflector panel 86 and the outer frame of the reflector panel support structure 84.

As shown in FIG. 12, TIR reflector panel 86 is subdivided in this preferred embodiment into 12 equal segments 120 of panels arranged in four rows and three columns. Because of the unique configuration of the TIR panel of the present invention, certain limitations are required in mounting the panel to the heliostat support structure. The TIR panel may be regarded as polarized since the prismatic structure only operates effectively in a certain orientation. Thus, it is necessary to closely align the longitudinal axis of the prisms relative to the mount axes of the support structure. Preferably, the reflector surface is about 20 feet long and 10 feet wide with the prismatic axes parallel to the longest dimension. Although the reflector panel may be a single continuous surface, subdivided panel sections are preferable to facilitate fabrication and installation. Moreover, the TIR configuration requires that the panel be as thin as possible to minimize absorption. Thus, the reflector material should not be used to provide any structure support for the panel. In the preferred embodiment disclosed each panel section is 60 inches by 40 inches by two inches thick. The panel weight is about three pounds per square foot.

The panel shown in FIGS. 1 through 4 has an infinite focal length similar to a flat silvered glass mirror. However, a degree of curvature may be introduced to the prism faces by bending the panel to curve along the length of the prisms. In this modification, the reflected rays converge making the solar image smaller at the central receiver in the tower and resulting in obvious cost and thermodynamic benefits.

Figures 13, 14:
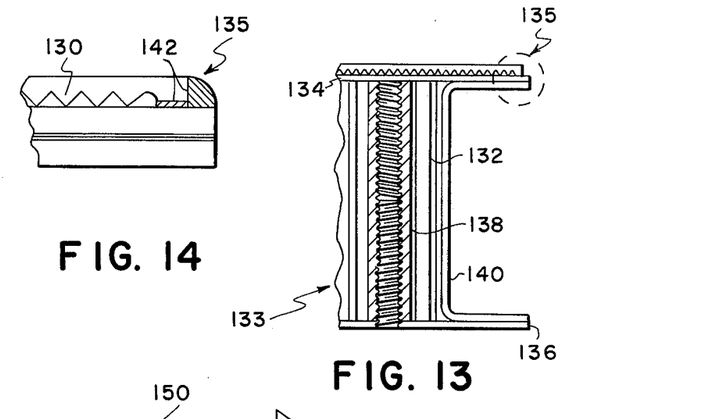
FIG. 13 is a cross-sectional side view of a portion of the panel of the heliostat shown in FIG. 10.
FIG. 14 is a close-up view of a circled portion of FIG. 13.
Figure 15:
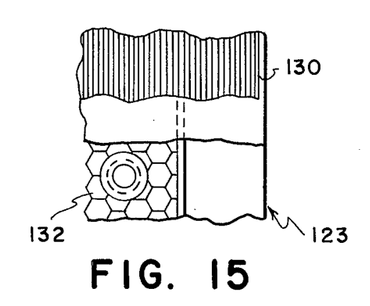
FIG. 15 is a front partially cutaway view of a circled portion of the panel surface of the heliostat shown in FIG. 12.

A preferred embodiment of the mounting structure of the present invention for supporting the heliostat panel 86 is shown in FIGS. 13, 14 and 15. In this configuration, the reflective material 130 of panel segment 120 is preferably a thin acrylic plastic fully supported by a thick honeycomb composite substrate 132. The substrate 132 is enclosed at both top and bottom by upper and lower facings 134 and 136 respectively. The facings are held together by a threaded insert 138 and are supported by a U-shaped structural frame 140 at the edge of the honeycomb substrate 132. Other suitable support materials and structures may be used, such as structural polyurethane which would provide a lighter but sufficient substrate at a reduction in cost.

The reflective material 130 may be attached to upper facing 134 by any suitable means including a flexible cement, spaced rubber tabs, metallic fasteners or a partial vacuum. In all cases, reflective material 130 is sealed to upper facing 134 at the periphery with a pressure seal 142 comprising a flexible material such as silicon which will flex with differential motion while preventing moisture entry.

Figure 16:
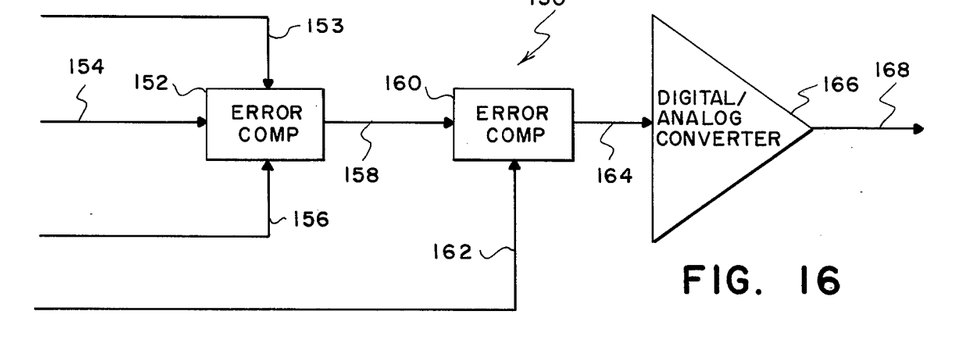
FIG. 16 is a block diagram of the error computation circuit for the heliostat of FIG. 10.
Figure 17:
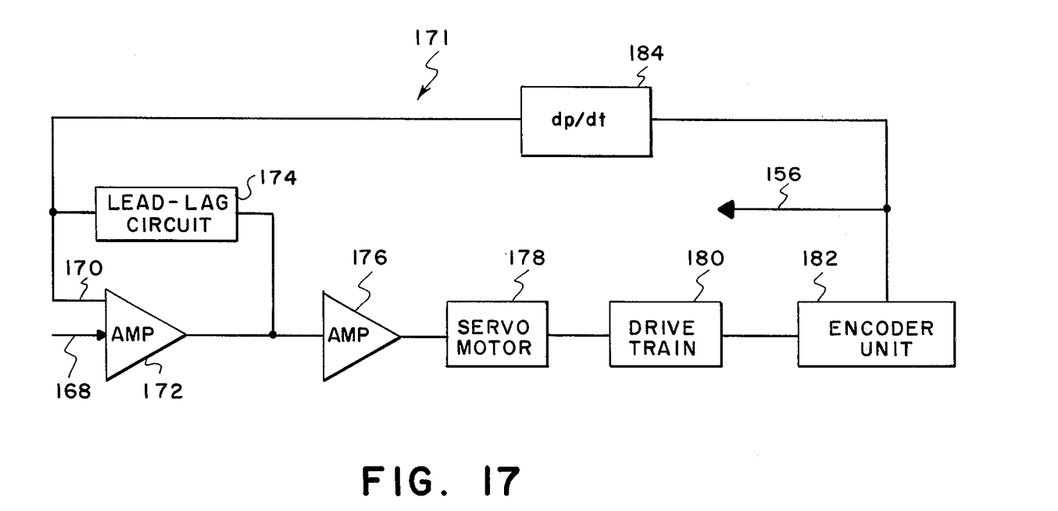
FIG. 17 is a block diagram of the servo-motor control system of the heliostat shown in FIG. 10.

The roll axis drive 106 and pitch axis linear actuator 102 of the heliostat are driven by a tracking control system shown in part in FIGS. 16 and 17. A conventional microprocessor (not shown) is programmed to compute Ephemeris Transit Time which is a measure of the trajectory of the sun in relation to the earth's orbital components. The microprocessor output is reduced to an hour angle signal and a declination signal, both given as a function of time. These two quantities are then converted to solar azimuth and altitude coordinates and finally reduced to roll and pitch control signals.

The roll and pitch signals are then each fed to a separate and identical auto guiding circuit 150 shown in FIG. 16. This circuit provides detection of the actual position of the sun using a pair of conventional photodetectors (not shown) which are mounted on the panel. Circuit 150 includes a first error computation unit 152 having three data inputs. A microprocessor line 154 provides the desired roll or pitch control signal which is then compared with the actual roll or pitch values on line 156 from the system encoder. The difference between the two input signals provides the tracking base line of the system. The third input line 153 provides a fine tuning signal for various time dependent phenomena such as structural deflections of the heliostat panel. The output error signal is fed by line 158 to a second error computation unit 160 having an input 162 from the roll or pitch solar detector. The base line tracking value is adjusted in response to the detector error signal so that the detected error in position approaches zero. The output tracking signal from unit 160 is fed by line 164 to a digital-to-analog converter 166 providing an analog output to a DC servo motor-encoder analog circuit on line 168.

The separate servo motor circuits, each identical to that shown in FIG. 17, each function as a stepping motor system to make the necessary corrections in pitch or roll. The roll or pitch rate is input on line 170 together with the analog error input from line 168 to amplifier 172 which is connected at the output to a feedback lead-lag circuit 174. The amplifier output also feeds through a power amplifier 176 to a servo motor 178 which in turn actuates a drive train 180 for the pitch or roll axis drive. An encoder unit 182 senses the pitch or roll position for feedback to the error computation unit 152. The output signal from the encoder 182 is also fed to a differentiating circuit 184 which provides the roll or pitch velocity signal to amplifier 172.

The tracking system shown in FIGS. 16 and 17 is self-improving, that is as the tabular corrections are improved over several days, the solar detector inputs will approach zero.

Figure 18:
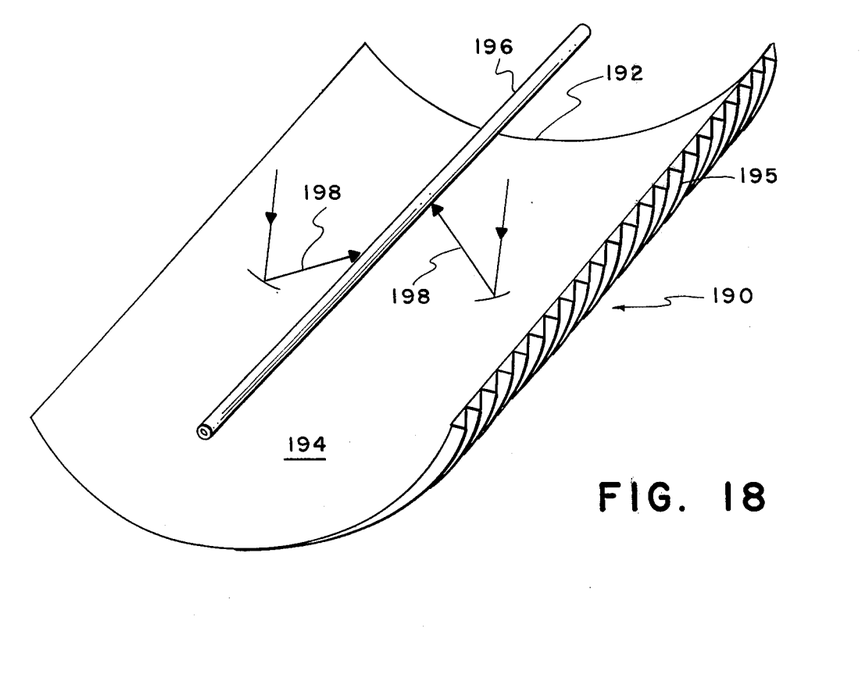
FIG. 18 is a perspective view of another embodiment of the present invention involving a parabolic trough collector.

Although the foregoing discussion has been directed to the use of a prismatic panel configuration in connection with a heliostat system, the present invention may also be utilized in other solar energy collection systems involving panels of different configurations. As one example, reference is now made to FIG. 18 disclosing a parabolic-cylindrical panel 190 in a solar collection system utilizing the prismatic plate of the present invention. The prismatic plate 192 is shaped to form a parabolic trough 194 by curving the plate along the longitudinal axes of the prisms 195. A linear absorber tube 196 lies within trough 194 spaced from the front surface of plate 192 and running parallel to the longitudinal axis of trough 194. The parabolic-cylindrical panel 190 is curved to focus all reflected rays 198 to intercept the linear tube 196. For this particular application, two-axis tracking is required to maintain the incidence plane of the solar rays parallel to the prism longitudinal axes. Thus, collectors with less than full sun-tracking capability, such as East-West troughs, could probably not efficiently use the prismatic plate of the present invention.

Figure 19:
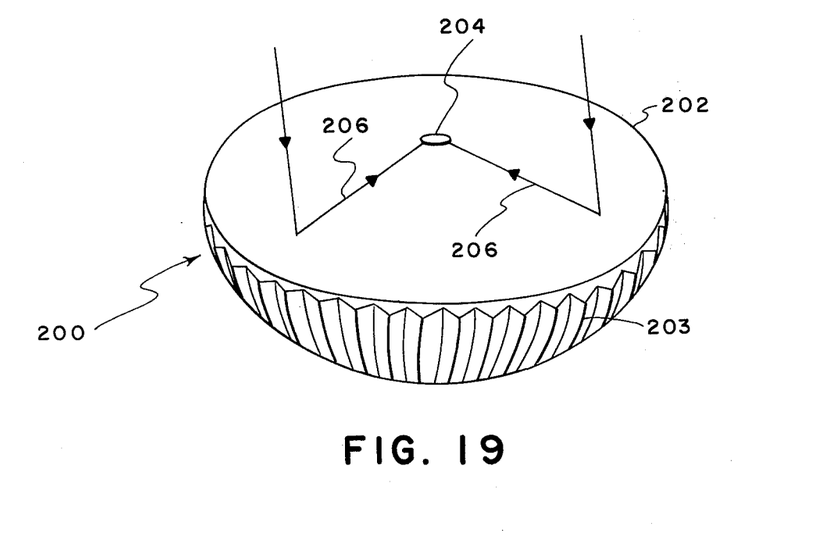
FIG. 19 is a perspective view of another embodiment of the present invention involving a paraboloidal collector.

Another example of a different type of solar collection system incorporating the present invention is shown in FIG. 19. A prismatic plate 202 is shaped to conform to a paraboloid panel 200 with the prism 203 being curved along their longitudinal axes. The axes of the prisms converge at a pole at the bottom of paraboloidal plate 202. A point receiver 204 functions as a solar ray absorber at the center focal point of the paraboloid to intercept all reflected rays 206. This approach requires full sun tracking, as in all conventional paraboloidal concentrators. The prism plate 202 shown in FIG. 19 is preferably fabricated by stamping or rolling the prismatic pattern into a flat acrylic sheet and then using a vacuum-forming or pressure-forming process to provide the necessary concave shape.

From the foregoing, it can be seen that the prismatic panel and heliostat of the present invention provide a number of important advantages over the prior art. Since no metal surfaces are used on the prismatic panel, the cost of production is reduced and durability is substantially increased. Moreover, the specular reflectance of the panel is substantially increased because of the absence of metallic absorption and scattering. A relatively inexpensive material may be used for the prismatic panel such as acrylic plastic which can be easily worked by extrusion and calendering to provide the necessary prismatic pattern. This type of material also provides the advantages of being lightweight, durable, nearly non-absorbing of the solar spectrum, inexpensive and virtually unbreakable. The prismatic material is also somewhat cooler in equilibrium temperature than other conventional material because of the low absorption of solar energy.

The panel support structure can be made from lightweight, low-cost construction and materials. The panel attachment for acrylic panels to the support structure can be formed with integral attachment holes during fabrication of the panel. A simple film plastic or sheet metal dust cover can be used to cover the back side of the prism to prevent the accumulation of dust and dirt. The simple receiver-directed tracking system with photodetector error feedback provides a simple and effective means of optimal solar tracking.

Although preferred embodiments of the invention have been discussed in detail, it should be understood that various changes, substitutions, and alterations can be made therein without departing from the spirit and scope of the invention as defined by the appended claims.

What is claimed is:

1. Apparatus for reflecting and concentrating solar rays in a solar energy collection system, comprising a receiver for collecting said reflected solar rays, and a prism member having an index of refraction equal to or greater than the square root of two to provide total internal reflection of incident solar rays toward said receiver, said prism member including a first face for receiving the incident solar rays and transmitting the rays through the prism member, and a plurality of pairs of prism faces each pair being oriented at substantially 90 degrees relative to each other to totally reflect each transmitted ray back through said first face to the receiver in a plane of reflection parallel to the plane of incidence of the corresponding incident ray.

2. The apparatus of claim 1 wherein said prism member comprises a unitary plate having a first transparent flat, front surface to receive the incident solar rays and a second prismatic rear surface, each said pair of prism faces forming an equal-sized right angle triangle in cross section.

3. The apparatus of claim 1 wherein said prism member comprises a plurality of separate triangular prisms having parallel longitudinal axes, the base of each prism lying along a common line to form said first face and the sides of each prism forming one of said pair of prism faces.

4. Apparatus for reflecting and concentrating solar rays in a solar power tower energy collection system, comprising a stationary receiver in a solar power tower for collecting said reflected solar rays, and a prismatic heliostat member having an index of refraction equal to or greater than the square root of two to provide total internal reflection of incident solar rays toward said receiver, said prismatic heliostat member including a first face for receiving the incident solar rays and transmitting the rays through the heliostat member, and a plurality of pairs of prism faces each pair being oriented at substantially 90 degrees relative to each other to totally reflect each transmitted ray back through said first face to the receiver in a plane of reflection parallel to the plane of incidence of the corresponding incident ray.

5. In a solar energy collection system for focusing the solar energy to reflect solar rays to a central location, the combination comprising a central receiver positioned at the central location to collect the focused solar energy, and a reflective surface for focusing the solar energy comprising a unitary transparent uncoated plate of material having an index of refraction equal to or greater than the square root of two, said plate having a smooth front surface, an intermediate thickness and a prism-shaped back surface, said back surface having a plurality of triangular prisms with parallel longitudinal axes, each prism having a cross section forming an isosceles, right-angle triangle with first and second sides oriented at substantially 45 degrees relative to the front surface, whereby solar rays incident to the front surface are transmitted through the intermediate thickness, totally internally reflected from the first side and the second side and transmitted back through the intermediate thickness and out the front surface to the receiver.

6. The apparatus of claim 5 wherein said plate material comprises extruded acrylic plastic.

7. In a solar energy collection system for focusing solar energy to reflect solar rays from a heliostat panel to a solar power tower, the combination comprising a central stationary receiver positioned in the solar power tower to collect the focused solar energy, and a reflective surface on the heliostat panel for focusing the solar energy comprising a unitary transparent uncoated plate of material having an index of refraction equal to or greater than the square root of two, said plate having a smooth front surface, an intermediate thickness and a prism-shaped back surface, said back surface having a plurality of triangular prisms with parallel longitudinal axes, each prism having a cross section forming an isosceles, right-angle triangle with first and second sides oriented at substantially 45 degrees relative to the front surface, whereby solar rays incident to the front surface are transmitted through the intermediate thickness, totally internally reflected from the first side and the second side and transmitted back through the intermediate thickness and out the front surface to the receiver of the solar power tower.

8. In a solar energy collection system having a reflective surface for focusing the solar energy at a central location, and a solar receiver positioned at the central location to collect the focused solar energy, the improvement wherein said reflective surface comprises a prism member having an index of refraction equal to or greater than the square root of two to provide total internal reflection of incident solar rays, said prism member including a first face for receiving the incident solar rays and transmitting the rays through the prism member, and a plurality of pairs of prism faces each pair being oriented at substantially 45 degrees relative to the first face and at substantially 90 degrees relative to each other to totally reflect each transmitted ray back through said first face to the solar receiver in a plane of reflection parallel to the plane of incidence of the corresponding incident ray.

9. A solar energy conversion system for intercepting, reflecting and collecting solar rays to generate useful energy comprising:

reflecting means including a panel having a transparent front surface for receiving incident solar rays and a rear surface forming a plurality of prismatic faces having parallel longitudinal axes and being oriented for total internal reflection of the rays transmitted through the panel from the front surface to transmit the rays back through the front surface in a plane parallel to the plane of the incident solar rays;

support means for carrying said panel and for orienting said panel to maintain the plane of incidence of the solar rays parallel to the longitudinal axes of the prismatic faces to transmit the reflected rays in a predetermined direction; and receiver means positioned to intercept the rays transmitted in said predetermined direction to absorb the rays and convert the solar energy from the rays to usable energy.

10. The system of claim 9 wherein said support means comprises a heliostat structure and tracking system and wherein said receiver means comprises a central tower having a stationary receiver at the top of the tower.

11. The system of claim 9 wherein said support means comprises a parabolic cylindrically-shaped trough structure and tracking system and wherein said receiver means comprises a linear absorbing receiver spaced from and running parallel to the longitudinal axis of the parabolic trough structure.

12. The system of claim 9 wherein said support means comprises a paraboloidal-shaped structure and tracking system and wherein said receiver means comprises a point absorbing receiver centrally located and spaced from the center of the paraboloidal-shaped structure.

13. A solar energy conversion system for intercepting, reflecting and collecting solar rays to generate useful energy comprising:
   reflecting means including a panel having a transparent front surface for receiving incident solar rays and a rear surface forming a plurality of prismatic faces having parallel longitudinal axes and being oriented for total internal reflection of the rays transmitted through the panel from the front surface to transmit the rays back through the front surface in a plane parallel to the plane of the incident solar rays;
   support means for carrying said panel and for orienting said panel to maintain the plane of incidence of the solar rays parallel to the longitudinal axes of the prismatic faces to transmit the reflected rays in a predetermined direction, said support means comprising a paraboloidal-shaped structure and tracking system; and
   receiver means comprising a point absorbing receiver centrally located and spaced from the center of the paraboloidal-shaped structure to intercept the rays transmitted in said predetermined direction to absorb the rays and convert the solar energy from the rays to usable energy.

14. A solar power tower energy conversion system for intercepting, reflecting and collecting solar rays to generate useful energy comprising:
   reflecting means including a panel having a transparent front surface for receiving incident solar rays and a rear surface forming a plurality of prismatic faces having parallel longitudinal axes and being oriented for total internal reflection of the rays transmitted through the panel from the front surface to transmit the rays back through the front surface in a plane parallel to the plane of the incident solar rays;
   heliostat structure for carrying said panel and for orienting said panel to maintain the plane of incidence of the solar rays parallel to the longitudinal axes of the prismatic faces to transmit the reflected rays in a predetermined direction; and
   a central tower having a stationary receiver positioned to intercept the rays transmitted in said predetermined direction to absorb the rays and convert the solar energy from the rays to usable energy.

15. The system of claim 14 wherein said panel is curved along the longitudinal axes of the prisms to enhance focusing of said solar rays on said stationary receiver.

16. A system for use in the reflection of solar rays to a solar energy receiver, comprising:
   a reflector panel for intercepting the solar rays and reflecting the intercepted solar rays to the receiver, said panel having a transparent front surface for receiving the solar rays and a back surface forming a plurality of prisms having parallel longitudinal axes and having a configuration to totally internally reflect to the solar energy receiver a light ray transmitted through the panel from the front surface having a plane of incidence parallel to the longitudinal axes of the prisms;
   support means for mounting said reflector panel and for rotating said panel about multiple axes; and
   tracking means for controlling said support means to maintain the orientation of said panel so that the plane of incidence of the solar rays is parallel to the longitudinal axes of the prisms and the reflected solar rays intercept the solar energy receiver.

17. The system of claim 16 wherein said prisms form isosceles, right-angle triangles in cross section, the sides being oriented at 45 degrees relative to the front surface.

18. The system of claim 16 wherein said panel is substantially flat for use in a heliostat reflector system.

19. The system of claim 16 wherein said panel is slightly curved along the longitudinal axes of the prisms to provide focusing of said solar rays at the receiver.

20. The system of claim 16 wherein said panel is substantially curved along the longitudinal axes of the prisms to form a parabolic cylinder for use in a trough collector system.

21. The system of claim 16 wherein said panel is curved along the longitudinal axes of the prisms to form a paraboloid for use in a paraboloidal concentrator system.

22. The system of claim 16 wherein said support means comprises means for rotating the panel about a first fixed axis directed toward the receiver, and means for rotating the panel about a second variable axis orthogonal with the first fixed axis, and wherein said panel is mounted on said support means with the longitudinal axes of the prisms perpendicular to the second variable axis.

23. The system of claim 16 wherein said tracking means comprises data processing means for computing the position of the sun relative to said panel and for generating a first signal representative of the computed position of the sun, error correcting means for sensing the position of the sun relative to said panel and for generating a second signal representative of the actual position of the sun, and control means for actuating said support means in response to said first and second signals.

24. A system for use in the reflection of solar rays to a solar energy receiver, comprising:
   a reflector panel for intercepting the solar rays and reflecting the intercepted solar rays to the receiver, said panel having a transparent front surface for receiving the solar rays and a back surface forming a plurality of prisms having parallel longitudinal axes and having a configuration to totally internally reflect a light ray transmitted through the panel from the front surface having a plane of incidence parallel to the longitudinal axes of the prisms, said panel being curved along the longitudinal axes of the prisms to form a paraboloid for use in a paraboloidal concentrator system;
   support means for mounting said reflector panel and for rotating said panel about multiple axes; and tracking means for controlling said support means to maintain the orientation of said panel so that the plane of incidence of the solar rays is parallel to the longitudinal axes of the prisms and the reflected solar rays intercept the solar energy receiver.

25. A system for use in the reflection of solar rays to a solar energy receiver in a solar power tower, comprising:
a heliostat reflector panel for intercepting the solar rays and reflecting the intercepted solar rays to the receiver, said panel having a transparent front surface for receiving the solar rays and a back surface forming a plurality of prisms having parallel longitudinal axes and having a configuration to totally internally reflect to the solar energy receiver a light ray transmitted through the panel from the front surface having a plan of incidence parallel to the longitudinal axes of the prisms;
support means for mounting said heliostat reflector panel and for rotating said panel about multiple axes; and
tracking means for controlling said support means, including means for orienting said heliostat panel so that the plane of incidence of the solar rays is parallel to the longitudinal axes of the prisms and means for orienting said heliostat panel so that the reflected solar rays are intercepted by the solar energy receiver of said solar power tower.

26. The system of claim 25 wherein said panel is curved along the longitudinal axes of the prisms to enhance focusing of said solar rays on said solar energy receiver.

27. A method of tracking the sun with a reflector panel having a plurality of prisms with parallel longitudinal axes to reflect incident solar rays to a solar energy receiver, comprising:
orienting the panel relative to the incident solar rays so that the plane of incidence of the solar rays is parallel to the longitudinal axes of the prisms to totally internally reflect the rays; and
orienting the panel relative to the receiver so that the receiver intercepts the totally internally reflected solar rays.

28. The method of claim 27 wherein the panel is oriented relative to the receiver by rotating the panel about a first axis until the receiver lies within a plane of reflection of the totally internally reflected solar rays, and then rotating the panel about a second axis until the receiver intercepts the totally internally reflected solar rays.

29. A method of tracking the sun with a heliostat reflector panel having a plurality of prisms with parallel longitudinal axes to reflect incident solar rays to a stationary solar energy receiver in a solar power tower, comprising:
orienting the heliostat panel relative to the incident solar rays so that the plane of incidence of the solar rays is parallel to the longitudinal axes of the prisms to totally internally reflect the rays; and
orienting the heliostat panel relative to the stationary receiver so that the receiver intercepts the totally internally reflected solar rays.

30. A method of tracking the sun with a reflector panel having a plurality of prisms with parallel longitudinal axes to reflect incident solar rays to a radiation receiver, comprising:
rotating said panel about a first axis directed toward the receiver to position the surface normal vector of the panel in a plane common to the incident solar rays, the center of the panel and the center of the receiver, and
rotating said panel about a second axis perpendicular to the first axis and to the longitudinal axes of the prisms to direct the solar rays to the receiver.

* * * * *